US012596210B2

(12) United States Patent
Bilenberg et al.

(10) Patent No.: US 12,596,210 B2
(45) Date of Patent: Apr. 7, 2026

(54) MULTI-LEVEL STRUCTURES AND METHODS FOR MANUFACTURING THE SAME

(71) Applicant: NIL Technology ApS, Kongens Lyngby (DK)

(72) Inventors: Brian Bilenberg, Ølstykke (DK); Tobias Hedegaard Bro, Brønshøj (DK)

(73) Assignee: NIL Technology ApS, Kongens Lyngby (DK)

( * ) Notice: Subject to any disclaimer, the term of this patent is extended or adjusted under 35 U.S.C. 154(b) by 572 days.

(21) Appl. No.: 17/923,130

(22) PCT Filed: May 7, 2021

(86) PCT No.: PCT/EP2021/062112
§ 371 (c)(1),
(2) Date: Nov. 3, 2022

(87) PCT Pub. No.: WO2021/224450
PCT Pub. Date: Nov. 11, 2021

(65) Prior Publication Data
US 2023/0350112 A1     Nov. 2, 2023

Related U.S. Application Data

(60) Provisional application No. 63/022,005, filed on May 8, 2020.

(51) Int. Cl.
*G02B 5/18* (2006.01)

(52) U.S. Cl.
CPC .................................. *G02B 5/1857* (2013.01)

(58) Field of Classification Search
CPC ............................ G02B 5/1857; G02B 5/1809
See application file for complete search history.

(56) References Cited

U.S. PATENT DOCUMENTS

| | | | |
|---|---|---|---|
| 6,562,253 | B1 | 5/2003 | Ogusu |
| 2011/0310220 | A1 | 12/2011 | McEldowney et al. |
| 2016/0033784 | A1 | 2/2016 | Levola et al. |
| 2016/0308020 | A1* | 10/2016 | Sreenivasan ...... H01L 21/30604 |
| 2018/0081265 | A1* | 3/2018 | Singh .................... G03F 7/0002 |

(Continued)

FOREIGN PATENT DOCUMENTS

| | | |
|---|---|---|
| CN | 1877372 A | 12/2006 |
| CN | 109407191 A | 3/2019 |
| JP | H0815510 A | 1/1996 |

(Continued)

OTHER PUBLICATIONS

International Search Report and Written Opinion in International Appln. No. PCT/EP2021/062112, dated Oct. 18, 2021, 19 pages.

(Continued)

*Primary Examiner* — Charles S Chang
(74) *Attorney, Agent, or Firm* — Fish & Richardson P.C.

(57) ABSTRACT

The present disclosure describes techniques for fabricating a multi-level structure. For example, in accordance with some implementations, the disclosure describes techniques for fabricating a multi-level master from which optical elements can be replicated either directly or by way of a sub-master. The disclosure also describes multi-level optical elements and processes for making them.

19 Claims, 4 Drawing Sheets

(56)                    References Cited

U.S. PATENT DOCUMENTS

| 2019/0056542 | A1 | 2/2019 | Miller et al. |
| 2020/0064642 | A1 | 2/2020 | Du et al. |

FOREIGN PATENT DOCUMENTS

| JP | 2001296416 | 10/2001 |
| JP | 2007187732 | 7/2007 |
| WO | WO 2010094441 | 8/2010 |
| WO | WO 2020006308 | 1/2020 |

OTHER PUBLICATIONS

International Preliminary Report on Patentability in International Appln. No. PCT/EP2021/062112, dated Nov. 17, 2022, 13 pages.
Office Action in Chinese Appln. No. 202180033570.9, mailed on Jul. 12, 2025, 15 pages (with English translation).

\* cited by examiner

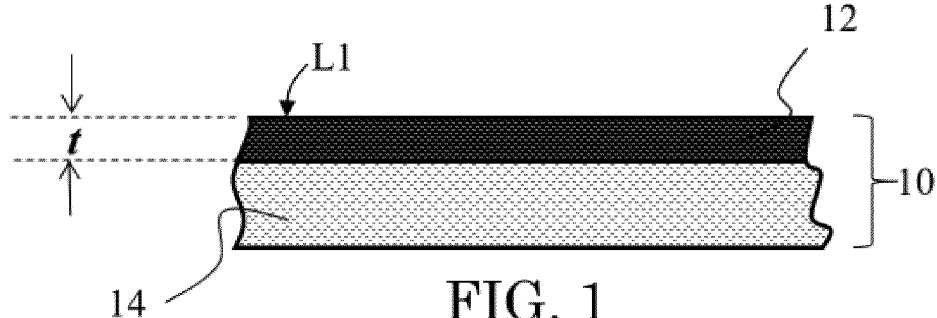
FIG. 1
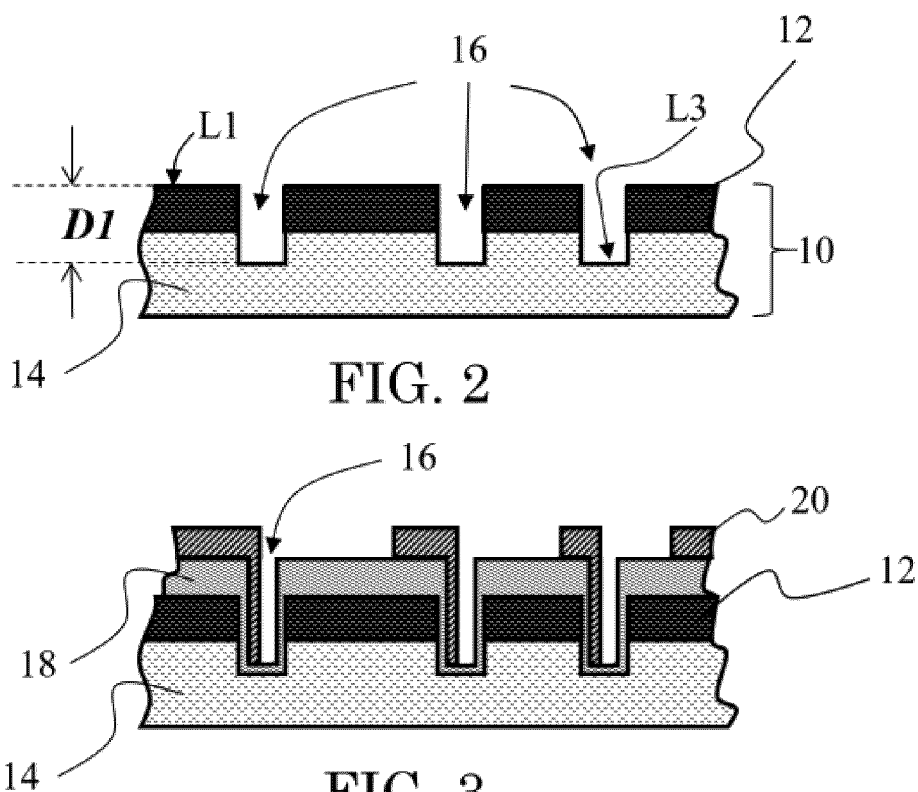
FIG. 2
FIG. 3

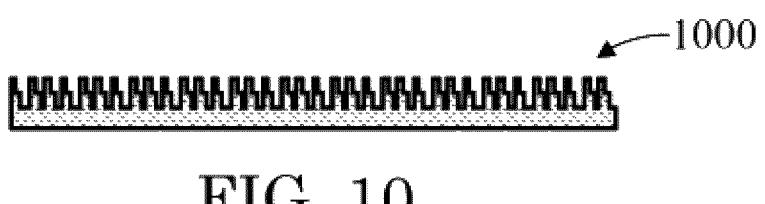
FIG. 10
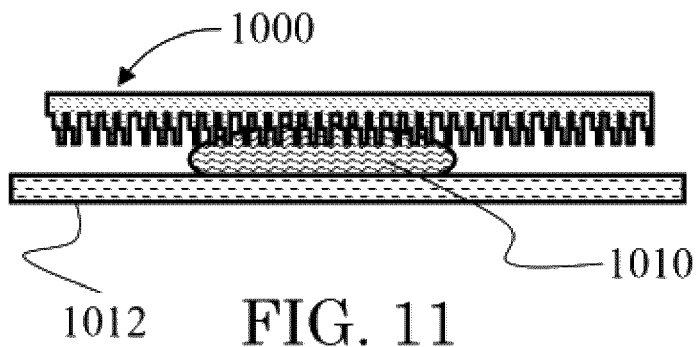
FIG. 11
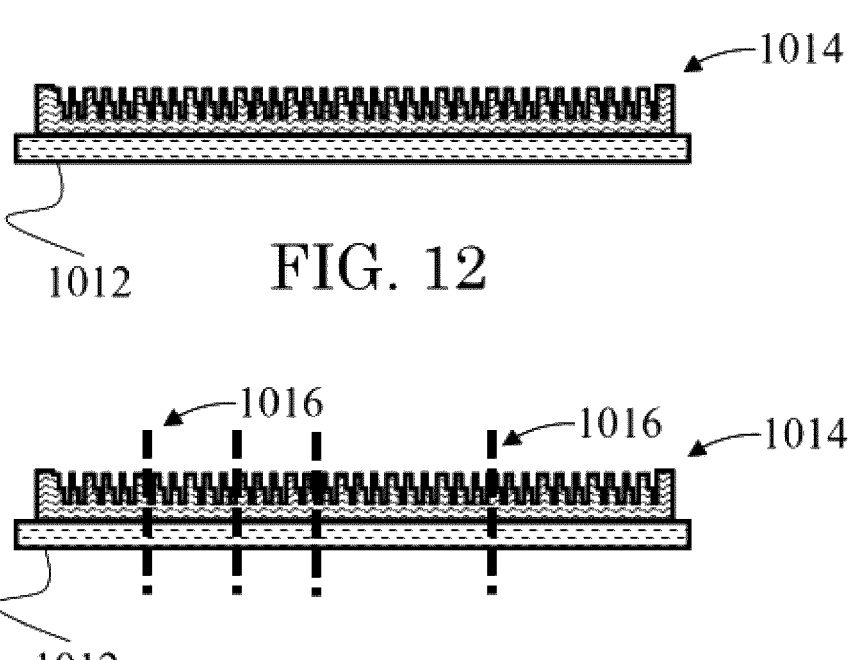
FIG. 12
FIG. 13

1

MULTI-LEVEL STRUCTURES AND METHODS FOR MANUFACTURING THE SAME

CROSS-REFERENCE TO RELATED APPLICATIONS

This application is a National Stage Application under 35 U.S.C. § 371 and claims the benefit of International Application No. PCT/EP2021/062112, filed May 7, 2021, which claims priority to U.S. Application No. 63/022,005, filed May 8, 2020, the disclosure of which is incorporated herein by reference.

FIELD OF THE DISCLOSURE

This disclosure relates to multi-level structures such as optical elements and masters (e.g., tools or molds) for their manufacture.

BACKGROUND

In principle, an arbitrary wave-front can be produced, for example, from a diffractive structure with high diffraction efficiency at the design wavelength. Such a diffractive structure typically has a surface relief depth which varies continuously over every 27-phase interval. This phase profile, with a continuous depth, is not easily fabricated. Multi-level phase structures, however, can provide a compromise that results in relatively high diffraction efficiency and ease of fabrication. Further, optical elements having a multi-level structure (i.e., three levels or more) can, in some instances, provide greater functionality than single or dual-level structures. For example, a diffractive optical element (DOE) composed of three levels can, in some instances, exhibit better optical performance than a diffractive optical element that has only one or two levels.

A first task in an overall fabrication process includes generating a set of one or more masks that contains the phase profile information. A second task is to transfer the phase profile information from the masks into the surface of the element specified by the design of the optical element. In some manufacturing methods, a master (e.g., tool or mold) or sub-master is used to form multiple optical elements by replication, which refers to a technique by means of which a given structure is reproduced.

BRIEF DESCRIPTION OF THE DRAWINGS

FIGS. 1-7 depict operations in an example method for producing a master or an optical element having a multi-level structure.

FIGS. 10-13 illustrate examples of operations in a replication process using a master having a multi-level structure.

SUMMARY

Figures 4, 5, 6, 7:
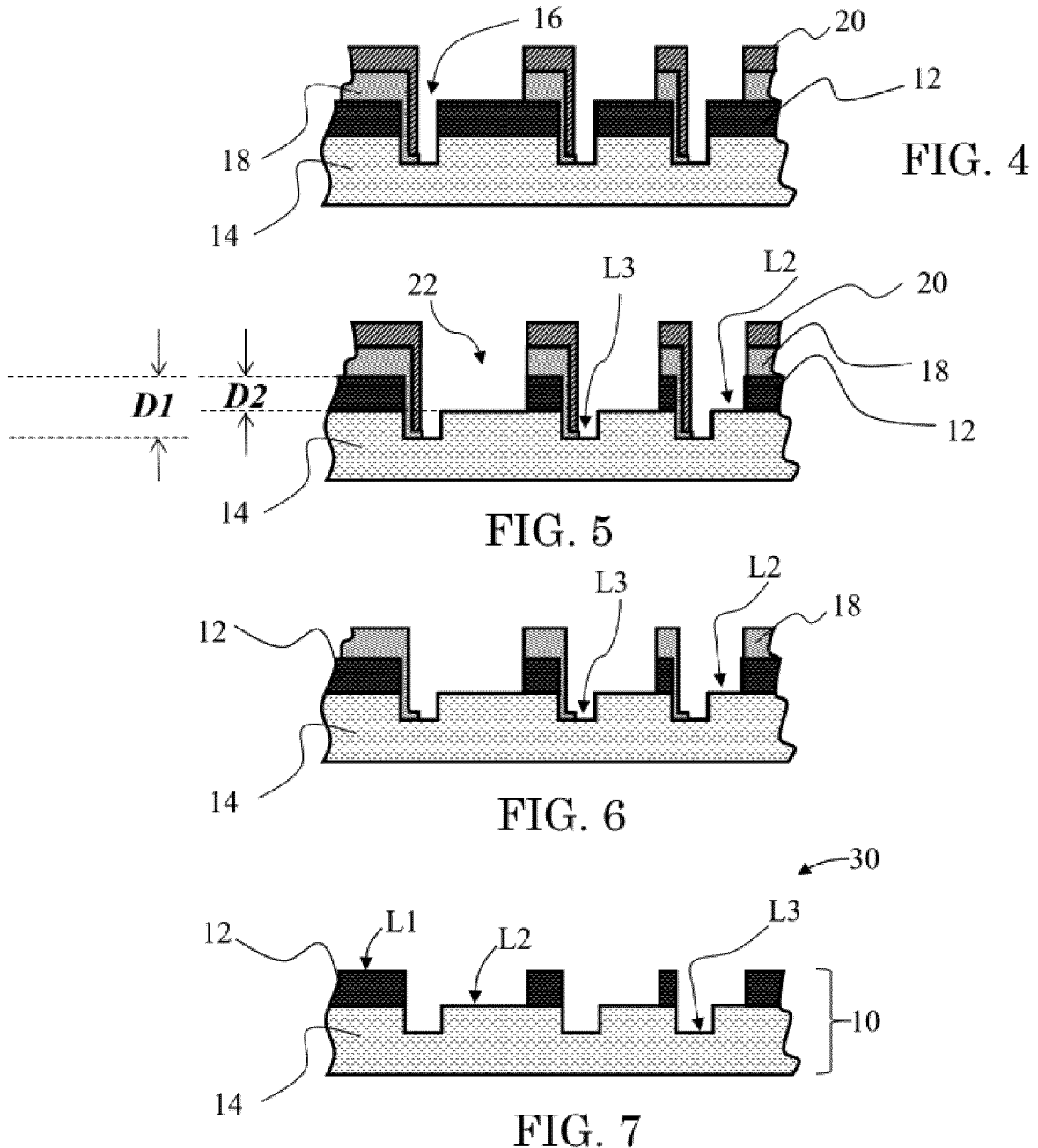

The present disclosure describes techniques for fabricating a multi-level structure. For example, in accordance with some implementations, the disclosure describes techniques for fabricating a multi-level master (e.g., tool or mold) from which optical elements (e.g., diffractive optical elements) can be replicated either directly or by way of a sub-master. The disclosure also describes multi-level optical elements and processes for making them.

For example, in one aspect, the present disclosure describes a method for manufacturing an optical element or a master having a multi-level structure. The method includes providing a substrate that includes a first substrate portion and a second substrate portion. The first substrate portion is on the second substrate portion and has a composition that differs from a composition of the second substrate portion. The method includes forming first trenches and second trenches through a surface of the substrate, wherein the first trenches extend through the second substrate portion and partially into the first substrate portion, and wherein a depth of the first trenches differs from a depth of the second trenches. Forming the second trenches includes etching through the second substrate portion, wherein the first substrate portion serves as an etch stop during formation of the second trenches.

Some implementations include one or more of the following features. For example, in some implementations, the method further includes providing a passivation material that at least partially fills the first trenches and that covers the surface of the substrate, and depositing a mask on portions of the passivation material. In some cases, providing a passivation material that at least partially fills the first trenches includes conformally coating bottom and side surfaces of the first trenches with the passivation material. In some cases, the second trenches are formed after depositing the mask, wherein the second trenches are disposed in portions of the substrate on which the mask is not present. Further, in some cases, before forming the second trenches, portions of the passivation material not covered by the mask are removed. In some implementations, after forming the second trenches, the mask and the passivation material are removed.

In some implementations, after forming the first trenches, a mask is deposited on portions of the surface of the substrate, and subsequently the second trenches are formed, wherein the second trenches are disposed in portions of the substrate on which the mask is not present.

In some implementations, the first substrate portion is composed at least in part of chromium and the second substrate portion is composed at least in part of silicon. The mask can be composed, for example, at least in part of a polymeric material. In some cases, the polymeric material is a resist. The passivation material can be composed, for example, at least in part of aluminum oxide. In some instances, at least partially filling the first trenches with a passivation material includes depositing the passivation material by atomic layer deposition.

The present disclosure also describes a master for replicating sub-masters or optical elements. The master includes a substrate having a first substrate portion and a second substrate portion. The first substrate portion is on the second substrate portion has a composition that differs from a composition of the second substrate portion. The substrate has a multi-level structure including at least three different levels. An upper surface of the second substrate portion defines a first one of the levels. A surface in a same plane as a boundary between the first and second substrate portions defines a second one of the levels. A surface in a plane between upper and lower surfaces of the first substrate portions defines a third one of the levels. In some implementations, the first substrate portion is composed at least in part of chromium, and the second substrate portion is composed at least in part of silicon.

The present disclosure also describes optical elements. For example, an optical element can include a substrate having a first substrate portion and a second substrate portion. The first substrate portion is on the second substrate portion has a composition that differs from a composition of the second substrate portion. The substrate has a multi-level structure including at least three different levels. An upper surface of the second substrate portion defines a first one of the levels. A surface in a same plane as a boundary between the first and second substrate portions defines a second one of the levels. A surface in a plane between upper and lower surfaces of the first substrate portions defines a third one of the levels. The depths and positions of the first, second and third levels with respect to one another can be configured, for example, to provide a predefined optical function.

The present disclosure also describes optoelectronic modules including an optical element that has a multi-level structure and that is aligned with an active optoelectronic component.

Other aspects, features and advantages will be readily apparent from the following detailed description, the accompanying drawings, and the claims.

DETAILED DESCRIPTION

The present disclosure describes techniques for fabricating a multi-level structure. For example, in accordance with some implementations, the disclosure describes techniques for fabricating a multi-level master (e.g., tool or mold) from which optical elements (e.g., diffractive optical elements) can be replicated either directly or by way of a sub-master. The disclosure also describes multi-level optical elements and processes for making them.

As shown in FIG. 1, a substrate 10 has a first substrate portion 12 and a second substrate portion 14. The first substrate portion 12, which is disposed on the second substrate portion 14, has a thickness t. The first substrate portion 12 may be composed, for example, at least in part of chromium. In some implementations, the first substrate portion 12 may be composed of other materials. The second substrate portion 14 may be composed, for example, of silicon. However, in some implementations, the second substrate portion 14 may be composed of other materials (e.g., fused or polycrystalline silica, or one or more dielectrics or metallic materials). In some instances, the substrate 10 is a wafer in which a lateral dimension is substantially greater than its thickness. The substrate 10 has a substrate surface, which establishes a first level L1 of the multi-level structure.

As shown in FIG. 2, the illustrated method includes creating first trenches 16 in the substrate 10. The first trenches 16 have a first depth D1 from the substrate surface and extend through the thickness of the first substrate portion 12 and partially into the second portion 14. The bottom of the first trenches 16 establishes another level for the multi-level structure. This level may be referred to as a third level L3. The first trenches 16 may be created, for example, by electron-beam lithography and etching, although other techniques may be used in some implementations. For some implementations, the first trenches 16 may range in width from a few nanometers to a few microns. In some instances, the dimensions of the first trenches 16 and their respective disposition may be related to a predetermined optical function, such as a diffractive optical function.

Next, as shown in FIG. 3, the illustrated method includes partially filling the first trenches 16 (i.e., conformally coating the bottom and side surfaces of the first trenches) with passivation material 18, and at the same time covering at least a portion of the substrate surface at level L1 with the passivation material. In some implementations, the passivation material 18 is composed at least in part of aluminum oxide. Other material may be used for the passivation material 18 in some implementations. The passivation material 18 may be deposited in the first trenches 16 and on top of the substrate surface, for example, by atomic layer deposition, although other techniques may be used in some implementations.

As further shown in FIG. 3, the illustrated method also includes selectively providing a mask 20 on portions of the passivation material 18 on the substrate surface as well as on portions of the passivation material that conformally coats the first trenches 18. The mask 20 may be composed, for example, at least in part of polymeric material such as a resist (e.g., a photoresist). In some cases, a mask material is coated onto the substrate surface (e.g., by spin coating), and then patterned (e.g., via standard lithography techniques) to form the mask 20.

As shown in FIG. 4, the illustrated method includes removing the passivation material 18 on the substrate surface that is not covered by the mask 20. Likewise, the passivation material 18 that coats the bottom and side surfaces of the first trenches 16, and that is not covered by the mask 20, is removed. Removing the passivation material 18 can include, for example, argon sputtering. In the example of FIG. 4, the passivation material that is not covered by the mask 20 is removed completely. In some instances, removing the passivation material can be performed by wet etching.

As shown in FIG. 5, the illustrated method includes creating second trenches 22 through the substrate surface, such that the second trenches have a second depth D2 relative to the substrate surface (i.e., relative to level L1). The depth D2 may be equal to (or substantially equal to) the thickness t1 of the first portion 12 of the substrate 10. The second trenches 22 are created in those regions of the substrate on which the mask 20 is not present. The second trenches 22 extend to the upper surface of the second portion 14 of the substrate 10, such that the bottom of the second trenches 22 establishes a further level of the multi-level structure. This further level may be referred to as a second level L2. In the illustrated method the first trenches 16 are deeper than the second trenches 22. That is, D1>D2, and the second level L2 is closer to the first level L1 than is the third level L3.

The second trenches 22 may be created, for example, by etching. Preferably, the etch used to create the second trenches 22 does not (or does not significantly) result in etching of the second portion 14 of the substrate. That is, the second portion 14 preferably serves as an etch stop. As a result, the depth of the second trenches 22 can be precisely controlled. Further, by allowing the second portion 14 to serve as an etch stop with respect to the etch used during formation of the second trenches 22, the etch used during formation of the second trenches 22 will not change the depth of the first trenches 16, which can help maintain precise control over the final depth of the first trenches 16 as well.

Next, as shown in FIG. 6, the illustrated method includes removing the material of the mask 20, for example, by a stripping technique. Further, as shown in FIG. 7, the illustrated method includes removing the remaining passivation material 18, for example, by a stripping technique.

An advantage of providing the layer of passivation material 18 in some implementations is that it can help eliminate or reduce the need for high-precision alignment during the subsequent lithographic steps. Further, the presence of the passivation material 18 during etching of the second trenches 22 can help prevent lateral etching into the first substrate portion 12 (see FIG. 5). Nevertheless, is some implementations, the passivation material 18 need not be provided, and the mask 20 can be deposited directly onto the substrate 10.

The resulting structure 30, as shown in the example of FIG. 7, has three different levels: L1, L2, L3, where the second level L2 is deeper in the substrate than is the first level L1, and where the third level L3 is deeper in the substrate (i.e., further from the first level L1) than is the second level L2. The resulting multi-level structure 30 is formed in a substrate that is composed of two or more portions 12, 14 disposed one over the other, where each portion is composed of a material that differs from the other portions. At least one of the levels in the multi-level structure 30 (i.e., the second level L2 in the illustrated example) is in the same plane as is the boundary between the first and second portions 12, 14 of the substrate, which have different compositions from one another.

In some implementations, the resulting multi-level structure 30 may function as an optical element (e.g., a DOE), that is, an optical element that has a multi-level structure, where the number of levels is at least three. Depending on the materials of the multi-level structure, the optical element may be configured to be operable for use, e.g., with infra-red (IR) or visible radiation. The depths and positions of the various levels with respect to one other can be configured according to a predefined optical function.

In some implementations, an optical element having a multi-level structure as described above can be integrated into modules that house one or more optoelectronic devices (e.g., light emitting and/or light sensing devices). The optical element can be used to modify or redirect an emitted or incoming light wave as it passes through the optical element.

Figure 8:
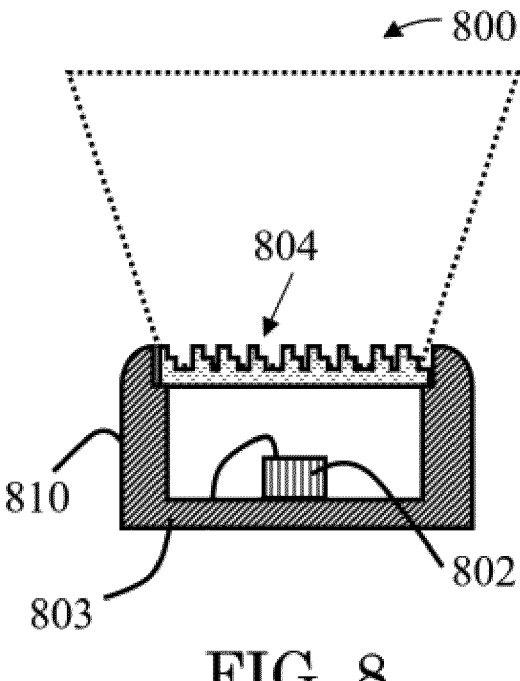
FIGS. 8 and 9 illustrate, respectively, examples of single channel and multi-channel modules that include an optical element having a multi-level structure.

As shown, for example, in FIG. 8, in some implementations, a light sensing module (for example, an ambient light sensor module) 800 includes an active optoelectronic device 802 mounted on a substrate 803. The optoelectronic device 802 can be, for example, a light sensor (e.g., a photodiode, a pixel, or an image sensor) or a light emitter (e.g., a laser such as a vertical-cavity surface-emitting laser, or a light emitting diode). The module housing may include, for example, spacers 810 separating the optoelectronic device 802 and/or the substrate 803 from an optical element 804 having a multi-level structure as described above.

In the single-channel module of FIG. 8, the optical element 804 can be disposed so as to intersect a path of incoming light or to intersect a path of outgoing light. The optical element can be aligned with the active optoelectronic component 802 and can be mounted to the housing. In some cases (e.g., where the optoelectronic component is a light sensor), light incident on the module 800 is modified or redirected by the optical element 804. For example, in some cases, the optical element 804 modifies one or more characteristics of the light impinging on the optical element before the light is received and sensed by the optoelectronic component 802. In some instances, for example, the optical element 804 may focus patterned light onto the optoelectronic component 802. In some instances, the optical element 804 may split, diffuse and/or polarize the light before it is received and sensed by the optoelectronic component 802.

In some cases (e.g., where the optoelectronic component 802 is a light emitter), light generated by the optoelectronic component 802 passes through the optical element 804 and out of the module. In the single-channel module of FIG. 8, the optical element 804 can be disposed so as to intersect a path of the outgoing light 806. The optical element 804 can modify or redirect the light. For example, in some cases, one or more characteristics of the light impinging on the optical element are modified before the light exits the module 800. In some cases, the module 800 is operable to produce, for example, one or more of structured light, diffused light, or patterned light.

Figure 9:
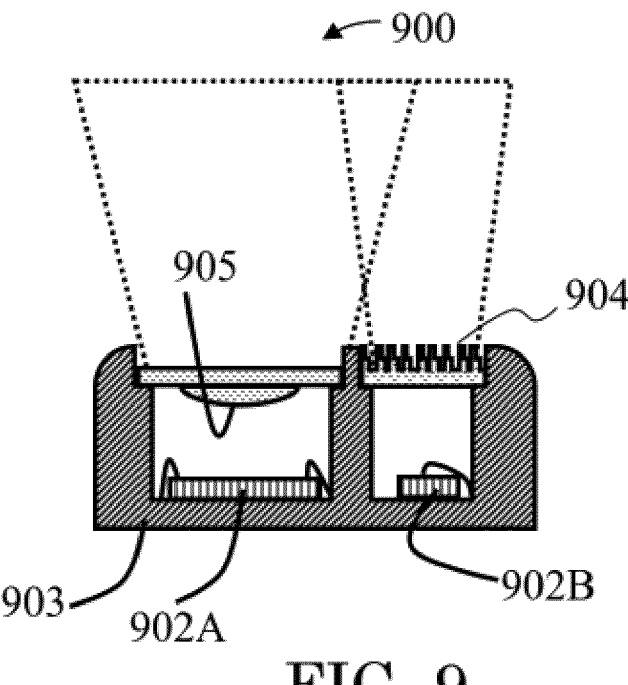

Multi-channel modules also can incorporate at least one optical element having a multi-level structure as described above. A shown in FIG. 9, such a multi-channel module 900 can include, for example, a light sensor 902A and a light emitter 902B, both of which can be mounted on the same printed circuit board (PCB) or other substrate 903. In the illustrated example, an optical element 904 having a multi-level structure as described above is mounted to the housing over the light emitter 902B. The multi-channel module can include a light emission channel and a light detection channel, which may be optically isolated from one another by a wall that forms part of the module housing. A lens 905 may be provided over the light sensor 902A.

In some instances, one or more of the modules described above may be integrated, for example, into mobile phones, laptops, televisions, wearable devices, or automotive vehicles.

In some implementations, the resulting multi-level structure 30 of FIG. 7 can serve as a master (e.g., a tool or mold), which can be used for making sub-masters or for replicating optical elements having a multi-level structure corresponding to that of the master. For example, in some implementations, the replicated optical elements have the same multi-level structure as the master, whereas in another implementations, the replicated optical elements have the inverse (i.e., a negative) of the master's multi-level structure. FIGS. 10 through 13 illustrate operations that may be performed to replicate optical elements directly from a multi-level master (e.g., having a multi-level structure such as described above in connection with FIG. 7). In this context, replication refers to a technique by means of which a given structure is reproduced. In particular, a structured surface can be embossed into a liquid or plastically deformable material (a "replication material"), then the material can be hardened, e.g., by curing using ultraviolet (UV) radiation or heating, and then the structured surface can be removed so that a negative of the structured surface (a replica) is obtained.

FIG. 10 illustrates an example of a master 1000 having a multi-level structure as described above. The multi-level master 1000 can be obtained, for example, by the method described in connection with FIGS. 1 through 7. Then, as shown in FIG. 11, polymeric replication material (e.g., uncured epoxy) 1010 is deposited between the multi-level master 1000 and a replica substrate 1012. The multi-level master 1000 and the replica substrate 1012 are brought into close proximity so that the multi-level structure of the master 1000 is pressed into the replication material 1010. The polymeric replication material 1010 can be cured (e.g., by ultraviolet radiation exposure and/or thermally). FIG. 12 depicts a replica 1014 of the multi-level master 1000 formed in the cured replication material. The replica 1014 includes a plurality of multi-level elements (e.g., optical elements such as DOEs). As indicated by FIG. 13, the replica 1014 is separated (e.g., by dicing along dicing lines 1016) so as to create multiple individual multi-level optical elements. One or more of the singulated optical elements, each of which has a multi-level structure corresponding to that of the master 1000, can be incorporated, for example, into single channel or multi-channel optoelectronic modules, such as those described above in connection with FIGS. 8 and 9.

In some implementations, the master 1000 may be used to replicate sub-masters, which then are used to replicate multi-level optical elements.

Although the foregoing examples describe multi-level structures having three levels, similar techniques can be used to create multi-level structures having more than three levels. For example, by appropriate selection of materials for portions of the substrate and by appropriate selection of etchants, the starting substrate can include additional layers that can be etched selectively, with one or more of the layers serving as an etch stop during etching of other layer(s).

Although particular implementations have been described in detail, various modifications can be made. Accordingly, other implementations are also within the scope of the claims.

What is claimed is:

1. A method for manufacturing an optical element or a master having a multi-level structure, the method comprising:

providing a substrate that includes a first substrate portion and a second substrate portion, the first substrate portion being on the second substrate portion, and the first substrate portion having a composition that differs from a composition of the second substrate portion;

forming first trenches through a surface of the substrate, wherein the first trenches extend through the first substrate portion and partially into the second substrate portion, after forming the first trenches, depositing a mask on portions of the surface of the substrate; and subsequently forming second trenches through the surface of the substrate, wherein the second trenches are disposed in portions of the substrate on which the mask is not present, wherein a depth of the first trenches differs from a depth of the second trenches, and wherein forming the second trenches includes etching through the first substrate portion, wherein the second substrate portion serves as an etch stop during formation of the second trenches.

2. The method of claim 1, further including:

providing a passivation material that at least partially fills the first trenches and that covers the surface of the substrate; and depositing a mask on portions of the passivation material.

3. The method of claim 2 wherein providing a passivation material that at least partially fills the first trenches includes conformally coating bottom and side surfaces of the first trenches with the passivation material.

4. The method of claim 2, further including:

after depositing the mask, forming the second trenches, wherein the second trenches are disposed in portions of the substrate on which the mask is not present.

5. The method of claim 4, further including:

before forming the second trenches, removing portions of the passivation material not covered by the mask.

6. The method of claim 4, further including:

after forming the second trenches:

removing the mask; and removing the passivation material.

7. The method of claim 2, wherein the mask is composed at least in part of a polymeric material.

8. The method of claim 7, wherein the polymeric material is a resist.

9. The method of claim 2, wherein the passivation material is composed at least in part of aluminum oxide.

10. The method of claim 2, wherein at least partially filling the first trenches with a passivation material includes depositing the passivation material by atomic layer deposition.

11. The method of claim 1, wherein the first substrate portion is composed at least in part of chromium and the second substrate portion is composed at least in part of silicon.

12. A master for replicating sub-masters or optical elements, the master comprising:

a substrate having a first substrate portion and a second substrate portion, the first substrate portion being on the second substrate portion, and the first substrate portion having a composition that differs from a composition of the second substrate portion, wherein the substrate has a multi-level structure including at least three different levels, wherein an upper surface of the first substrate portion defines a first one of the levels, a surface in a same plane as a boundary between the first and second substrate portions defines a second one of the levels, and a surface in a plane between upper and lower surfaces of the second substrate portion defines a third one of the levels, wherein the surface that defines the second one of the levels is a bottom of a first trench that extends entirely through the first substrate portion, and wherein the surface that defines the third one of the levels is a bottom of a second trench that extends entirely through the first substrate portion and Partially through the second substrate portion.

13. The master of claim 12, wherein the first substrate portion is composed at least in part of chromium and the second substrate portion is composed at least in part of silicon.

14. A method of fabricating optical elements, the method comprising: using a master as in claim 12 to replicate the optical elements.

15. The method of claim 14 including replicating the optical elements in a polymeric material.

16. A method comprising:

using a master as recited in claim 12 to replicate at least one sub-master.

17. An optical element comprising:

a substrate having a first substrate portion and a second substrate portion, the first substrate portion being on the second substrate portion, and the first substrate portion having a composition that differs from a composition of the second substrate portion, wherein the substrate has a multi-level structure including at least three different levels, wherein an upper surface of the first substrate portion defines a first one of the levels, a surface in a same plane as a boundary between the first and second substrate portions defines a second one of the levels, and a surface in a plane between upper and lower surfaces of the second substrate portion defines a third one of the levels, wherein the surface that defines the second one of the levels is a bottom of a first trench that extends through the first substrate portion, and wherein the surface that defines the third one of the levels is a bottom of a second trench that extends through the first substrate portion and partially through the second substrate portion.

18. The optical element of claim 17, wherein depths and positions of the first, second and third levels with respect to one another are configured to provide a predefined optical function.

19. A module comprising:

an active optoelectronic component;

a housing; and an optical element as recited in claim 17, wherein the optical element is aligned with the active optoelectronic component and is mounted to the housing.

\* \* \* \* \*